United States Patent [19]

Thomas et al.

[11] Patent Number: 6,027,428

[45] Date of Patent: Feb. 22, 2000

[54] AUTOMATED METHOD AND APPARATUS FOR PROVIDING REAL TIME PERSONAL PHYSICAL FITNESS INSTRUCTION

[76] Inventors: Mark Thomas, 5058 Dunemuir Common, Fremont, Calif. 94556; William Stuntz, 1790 St. Andrews Ct., Milpitas, Calif. 95036

[21] Appl. No.: 09/069,695

[22] Filed: Apr. 29, 1998

[51] Int. Cl.[7] .................................................. G09B 19/00
[52] U.S. Cl. ................................................. 482/4; 434/319
[58] Field of Search .................................... 434/253, 319, 434/320; 482/1–9, 900–902

[56] References Cited

U.S. PATENT DOCUMENTS

| 3,765,106 | 10/1973 | Cornell | 434/320 |
| 4,078,315 | 3/1978 | McFadden | 434/319 |
| 4,340,972 | 7/1982 | Heist | 434/253 |
| 4,867,442 | 9/1989 | Matthews | 482/8 |
| 5,061,186 | 10/1991 | Jost et al. | 434/185 |

OTHER PUBLICATIONS

"Heartalker™ Personal Trainer," Lifestyle Fascination Catalog, Early Spring 1998, cover and p. 43.

"Aiwa HS–SP750 Cross Trainer Personal Stereo," *Men's Health*, Apr. 1998, p. 59.

*Primary Examiner*—Glenn E. Richmon
*Attorney, Agent, or Firm*—Blakely Sokoloff Taylor & Zafman, LLP

[57] ABSTRACT

A system providing for personalized real-time instructions for physical fitness training. A data storage medium stores data comprising a set of instructions for physical fitness training on one or more tracks. A playback device reads the instructions stored on the data storage medium and converts them to an audio signal. An audio speaker connected to the playback device provides the audio signal, comprising the set of instructions, to a user located proximate the speaker.

23 Claims, 5 Drawing Sheets

AUTOMATED METHOD AND APPARATUS FOR PROVIDING REAL TIME PERSONAL PHYSICAL FITNESS INSTRUCTION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to an automated system for providing personal instruction. In particular, the present invention is an automated system for providing personalized physical fitness instruction and training.

2. Description of the Related Art

Most individuals, from amateur to professional athletes, recognize the benefits of participating in some form of regular exercise, whether to improve sports performance, rehabilitate atrophied or injured muscles, or maintain physical and mental health. In addition to participating in one or more sport specific exercises, many individuals participate, or would like to participate, in a regular physical fitness or health program. Many people, however, lack a proper understanding of the procedures, movements and techniques necessary for conducting a useful and productive physical fitness routine, such as weight lifting. For that reason, many athletes consider the services of a professional trainer a key aspect of their fitness training program. A personal trainer takes into consideration the skills, abilities and goals of an athlete in tailoring a physical fitness program that meets the needs of the athlete. Moreover, the personal trainer instructs, encourages, and assists the client through each workout comprising, for example, a warm-up routine, a series of exercises, a cool-down period and stretching.

However, most individuals, athletes or otherwise, are neither able to afford the fees required, nor commit to the necessary time or schedule required, to retain a physical fitness trainer. What is needed then is a less expensive, flexible alternative to training under the guidance of a physical fitness trainer that otherwise provides the benefits derived from the services provided by the trainer. Instructional videos for providing physical fitness instruction are commercially available. However, they are generally not well suited to personalized training in a group environment, for example, at a heath and fitness club. Moreover, such instructional videos generally follow a fixed format that does not allow the user to choose between multiple exercise options. Additionally, such videos generally fail to provide real-time instruction for the user.

BRIEF SUMMARY OF THE INVENTION

Disclosed is a system providing for personalized real-time instructions for physical fitness training. A data storage medium, such as an audio cassette tape or compact disc, stores data comprising a set of instructions for physical fitness training on one or more physical tracks. A playback device, such as an audio cassette player or compact disc, reads the instructions stored on the data storage medium and converts them to an audio signal. An audio speaker, e.g., a headset, connected to the playback device provides the audio signal, comprising the set of instructions, to a user. Optionally, the user may select a different set of instructions by controlling the playback device to read a particular track of the data storage medium containing a set of instructions, e.g., on a compact disc. Alternatively, the playback device may provide an audio signal comprising multiple channels, e.g., a left and right channel of a stereo audio signal, wherein the separate channels comprise different sets of instructions, and the user selects to receive either the left or right channel of the audio signal.

BRIEF DESCRIPTION OF THE SEVERAL VIEWS OF THE DRAWINGS

The present invention is illustrated by way of example and not limitation in the following figures. Like references indicate similar elements, in which.

DETAILED DESCRIPTION OF THE INVENTION

The present invention generally relates to a system providing for personalized real-time instructions for physical fitness training, in which a data storage medium stores data comprising a set of instructions for physical fitness training on one or more tracks. A playback device reads the instructions stored on the data storage medium and converts them to an audio signal for transmission to an audio speaker connected to the playback device. The speaker provides the audio signal, comprising the set of instructions, to a user located proximate the speaker. In the following description, numerous specific details are set forth in order to provide a thorough understanding of the present invention. However, it will be apparent to one of ordinary skill in the art that the present invention may be practiced without these specific details. In other instances, well-known structures, architectures, and techniques have not been shown to avoid unnecessarily obscuring the present invention.

Figure 1:
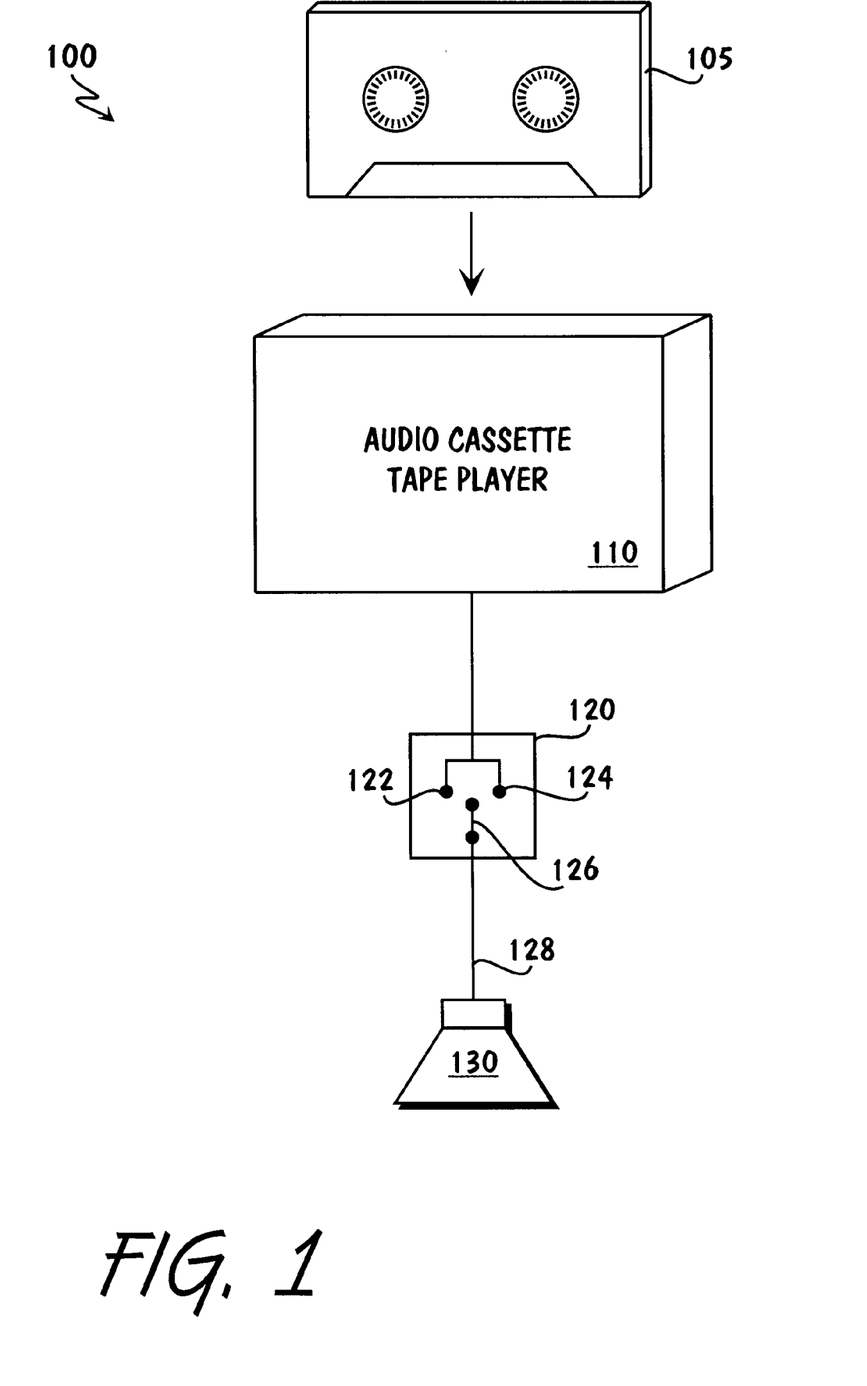
FIG. 1 is a block diagram of a playback device as may be utilized by an embodiment of the present invention.

With reference to FIG. 1, a playback device as may be utilized by an embodiment of the present invention is described. Illustrated is a audiocassette tape player system 100, including audiocassette tape player 110 for receiving audiocassette tape 105 and playing back real-time instructions for physical fitness training recorded onto audiocassette tape 105. An audio speaker 130, e.g., a headset, is coupled to audiocassette tape player 110 for receiving audio output from audiocassette tape player 110. Although the audio speaker is illustrated as being coupled to player 110 via a wire 128, it is appreciated that the audio speaker may receive audio output from player 110 via other means, e.g., radio frequency transmission, etc. Coupled in communication with player 110 and speaker 130 is a switch 120. As explained further below, switch 120 may be controlled by the user of player 110 to select between a left or right channel of a stereo signal output by player 110. When mechanical switching means 126 of switch 120 is placed such that it is connected to lead 122 of switch 120, audio speaker 130 receives, for example, the left channel of a stereo signal output by player 110. Conversely, when mechanical switching means 126 is manipulated by the user such that it is connected to lead 124 of switch 120, audio speaker 130 is coupled to receive the right channel of the stereo signal output by player 110. It is appreciated by those skilled in the art that other means for switching between channels is within the scope of the present invention, e.g., an electronic switch comprising one or more diodes and/or transistors. Further explanation of the switching means, therefore, is not provided.

Figure 2:
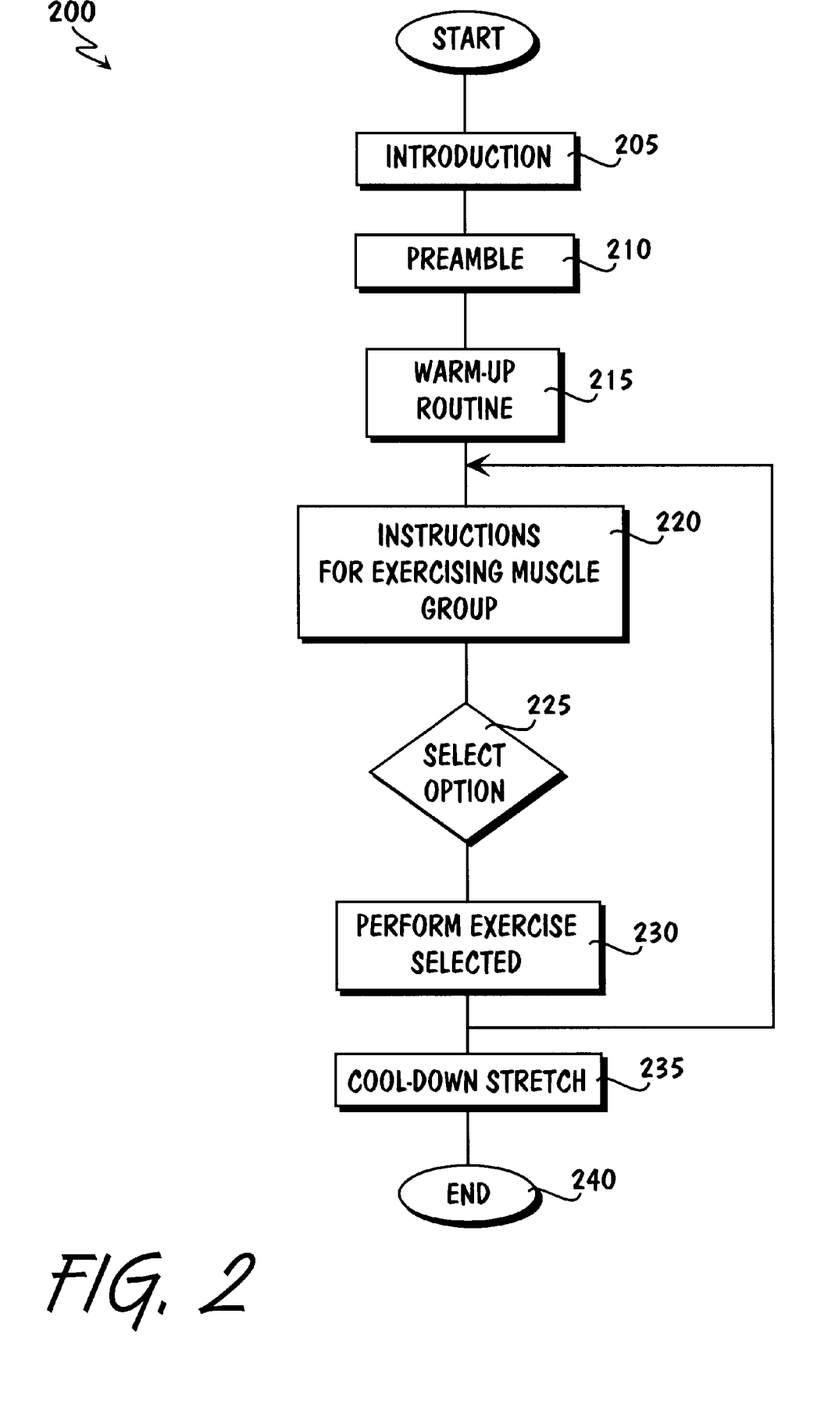
FIG. 2 is a flow diagram of an embodiment of the present invention.

FIG. 2 provides a flow chart describing an embodiment 200 of the present invention for use in conjunction with the audiocassette tape player system 100. A user first begins by viewing a video program, or alternatively, listening to an audio program, providing an introduction 205 to the use of system 100 for real time instructions for physical fitness training. The introduction includes, among other things, instruction for the user in selecting the appropriate one or more audio tapes 105 for physical fitness training, a questionnaire regarding product registration and/or the user's current level of physical fitness and goals (which may be utilized in helping the user select the appropriate audio tape), etc. Further, it is contemplated the introduction provides instruction on proper technique and form for each exercise. The introduction may further provide instruction regarding various exercise options available for each muscle group, e.g., exercise options primarily designed to work the pectoralis major muscle group such as bench press and push-ups.

In the preferred embodiment, the introduction is recorded on a video cassette tape and played back to the user via a videocassette recorder. The use of video provides the benefit of illustrating safe, proper form and technique for each exercise, and options for carrying out each exercise. Alternatively, the user may retrieve one or more video clips from CD-ROM or downloaded from an intranet or Internet server, for viewing on a display device coupled to a computer system. Alternatively, a user can refer to a written set of instructions provided, for example, in a booklet or quick reference card.

Upon completion of viewing the introductory material at 205, and selecting an appropriate audiocassette tape 105, the user is ready to proceed with his/her exercise program, guided by the real-time instructions provided on audiocassette tape 105. At step 210, the user inserts the audiocassette tape 105 into audiocassette player 110 and presses the play button. The audiocassette provides a preamble including, for example, a legal disclaimer, a brief summary of the subject matter recorded on the tape 105, the manner of proceeding in listening to the tape and performing the exercises as instructed by the tape. At step 215, the user is instructed to perform a warm-up routine in preparation of the exercise. The nature of the warm-up routine, e.g., stationary bicycle, stationary rowing machine, etc., may differ depending on the physical fitness exercises to be performed in accordance with the exercise instructions recorded on the tape following the instructions relating to the warm-up exercises.

At step 220, the user is provided specific instructions for exercising a particular muscle group. For example, the user may be instructed to perform squats for exercising primarily the gluteus maximus and quadriceps muscle groups. Importantly, the audio program instructs the user on a real time basis on what to do. The instructions are in keeping with the instructions the user would receive from a personal physical fitness trainer. That is, the audio program instructs the user on the exercise to perform, the number of sets of repetitions to perform for the exercise, the number of repetitions per set, when to start a set of repetitions for the exercise, the duration for each repetition in the set, the duration for recovery between sets of repetitions, and so on.

Significantly, the instructions at 220 provide options in terms of the exercise to be performed for working a particular muscle group. For example, the user may be provided the option of performing chin-up, barbell or dumbell curl exercises for working the biceps muscle group. At step 225, the user selects which exercise to perform, depending on, for example, user preference or the availability of necessary exercise equipment. At step 230, the user performs the number of sets of repetitions, number of repetitions per set, the proper duration for each repetition, etc., in accordance with real-time instructions. For example, the instructions at step 230 may count repetitions for the user, instruct the user as to proper form, and provide encouragement. The instructions may be identical for each exercise option relating to a particular muscle group, and thus may be followed by the user regardless of the option selected by the user. Alternatively, the instructions may differ slightly, e.g., instructions as to proper form, depending on the exercise option selected. In the former instance, the user simply elects at step 225 to perform at step 230 whatever exercise option is provided at step 220. In the latter instance, different sets of instructions are recorded on audiocassette tape 105 on different audio channels. For example, instructions for performing barbell curls are recorded on the left channel of a stereo audio signal, and instructions for performing chin-ups are recorded on the right channel of the stereo audio signal. The user selects at 225 the set of instructions to listen to by switching via switch 120 to either the left or right channel. Importantly, in the latter instance, the instructions are synchronized with respect to each other so that the user may switch from one set of instructions on one channel, e.g., the left channel, to another set of instructions on another channel, e.g., the right channel, and then back to the original channel, in sequence with the instructions on each channel for exercising the particular muscle group.

Upon completion of the particular exercise selected at step 230, the user continues on to the next exercise for which instructions are provided on the audio tape at step 220. The user continues in the same manner as described above for each exercise performed for each muscle group, until the end of the instructions on the audio tape, or the user opts to end the work out. At step 235, the user performs a cool down routine, which may including stretching or the like, in accordance with the instructions provided on the audiocassette tape 105.

Figure 3:
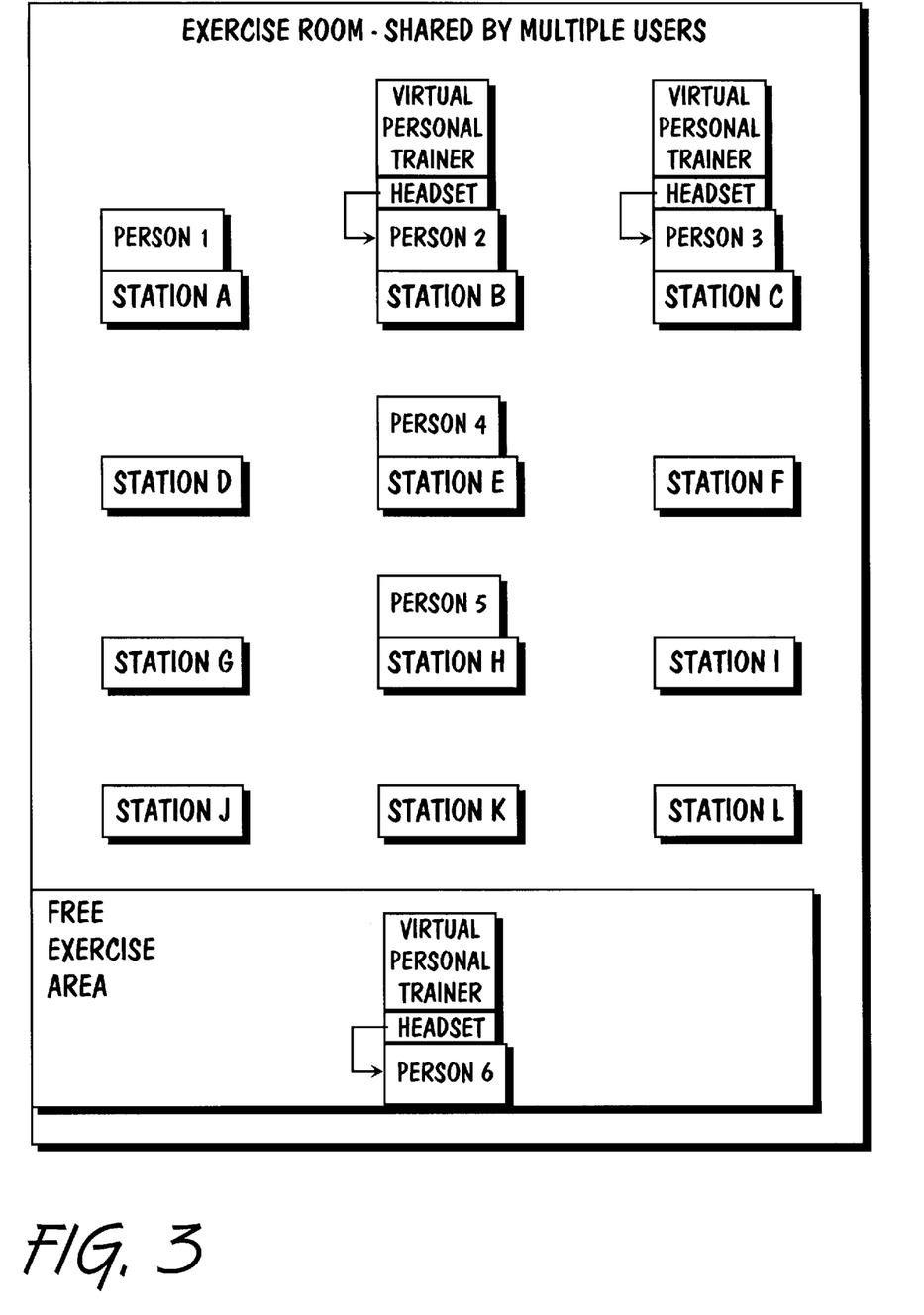
FIG. 3 is a diagram of multiple uses of an embodiment of the present invention in a group environment.

FIG. 3 illustrates how the real time instructions for physical fitness training as contemplated by the above described embodiment of the present invention operates in a group environment. A first person (person 1) at exercise station A is performing an exercise without the benefit of an audio program providing instruction for using the exercise equipment at station A. However, persons 2 and 3 at stations B and C, respectively, are each listening to instructions recorded on separate audiocassette tapes 105. The instructions for operation of the equipment at station B are provided only to person 2 by virtue of the headset utilized by person 2 as audio speaker 130. Likewise, the instructions for the operation of the equipment at station C are provided only to person 3 by virtue of the headset utilized by person 3 to receive the audio signals transmitted by an audiocassette tape player proximate person 3. In a similar manner, person 6 is provided personal real-time physical fitness instructions via playback of an audiocassette tape 105 by audiocassette player 110 coupled to the headset worn by person 6. Person 6 may well be performing an alternate exercise for the same muscle group as being exercised by any of the other persons at stations A, B, C, E of H in the exercise room. Person 6 selects an optional exercise to be performed in the free exercise area without the aid of exercise equipment at one of the in use stations, following the instructions provided at step 220. Alternatively, person 6 selects at step 225 a second audio channel as described above and follows along with the instructions provided on the second audio channel.

Figure 4:
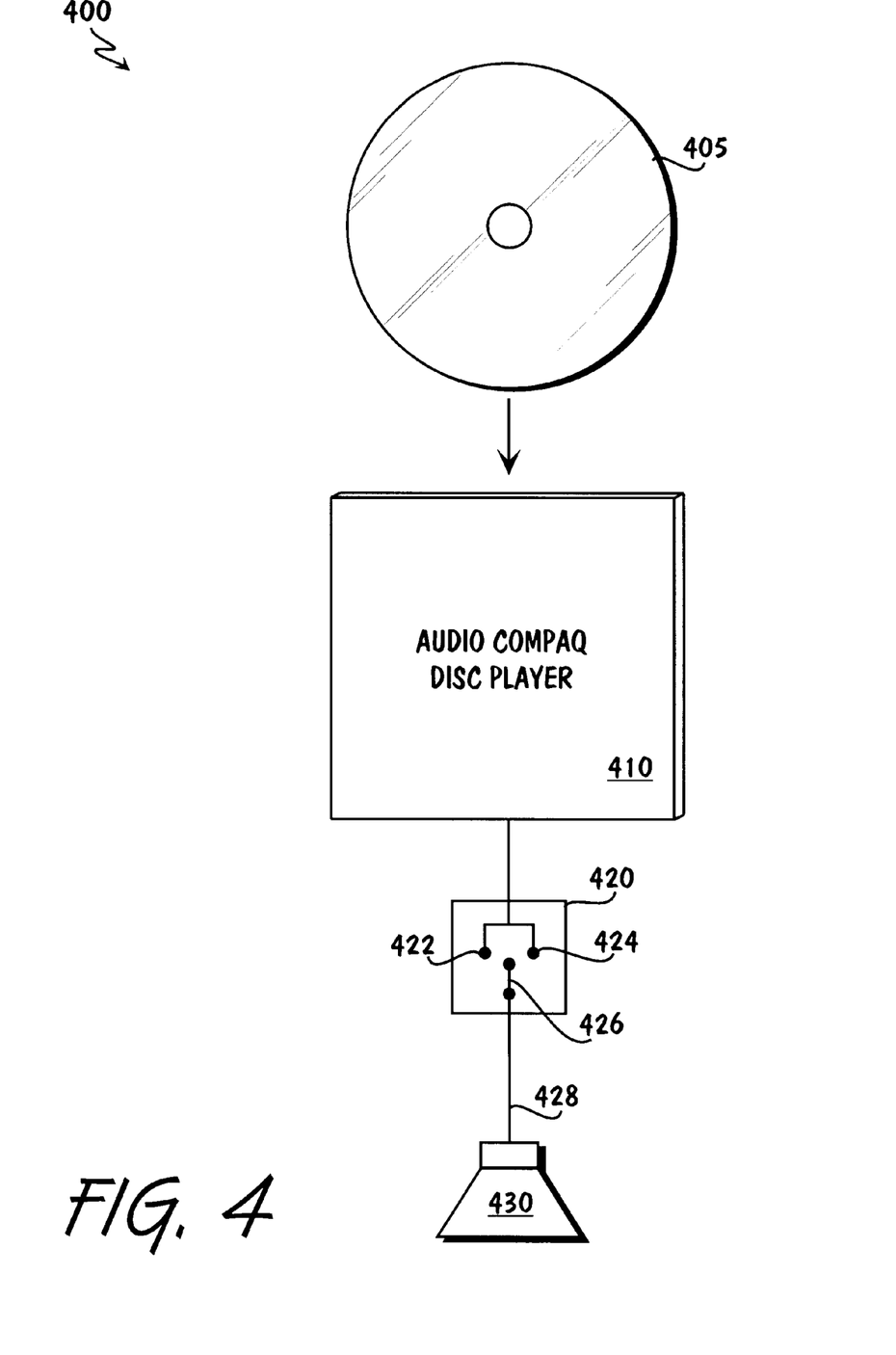
FIG. 4 is a block diagram of an alternative playback device as may be utilized by an embodiment of the present invention.

FIG. 4 provides a block diagram of an alternative playback device for use with an embodiment of the present invention. The system 400 contemplates the use of an audio compact disc (CD) player 410 for receiving audio compact disc (CD) 405 and playing back real-time instructions for physical fitness training recorded onto CD 405. An audio speaker 430, e.g., a headset, is coupled to CD player 410 for receiving audio output from CD player 410. As with the embodiment described in connection with FIG. 1, although the audio speaker is illustrated as being coupled to CD player 410 via a wire 428, it is appreciated that the audio speaker may receive audio output from CD player 410 via radio frequency transmission, or other means, without departing from the scope of the invention. Coupled in communication with CD player 410 and speaker 430 is a switch 420 that is controlled by the user of CD player 410 to select between a left or right channel of a stereo signal output by CD player 410. When the switch 420 is connected to lead 422, audio speaker 430 receives the left channel of a stereo signal output by CD player 410. Conversely, when the switch is manipulated by the user to connect to lead 424 of switch 420, audio speaker 430 is coupled to receive the right channel of the stereo signal output by CD player 410.

An embodiment of the present invention operates in conjunction with the CD player system 400 in essentially the same manner as the audiocassette tape player system 100 as described above with reference to FIG. 2. The user views the introductory material at step 205, selects an appropriate audio CD 405, and proceeds with his/her exercise program, guided by the real-time instructions provided on audio CD 405. Various portions of the selected exercise program, or different exercise programs, may be recorded on different tracks on the CD. At step 210, the user inserts the CD 405 into CD player 410, selects the appropriate track (or defaults to track 1) and presses the play button. At step 220, instructions provide options for the exercises to be performed for working a particular muscle group. At step 225, the user selects which exercise to perform, depending on, for example, user preference or the availability of necessary exercise equipment.

At step 230, the user performs the number of sets of repetitions, number of repetitions per set, the proper duration for each repetition, etc., in accordance with real-time instructions. The instructions may be identical for each exercise option relating to a particular muscle group, in which case, the instructions guide the user regardless of the option selected. Alternatively, the instructions may differ slightly, e.g., instructions as to proper form, depending on the exercise option selected. In the former instance, the user simply elects at step 225 to perform at step 230 whatever exercise option is provided at step 220. In the latter instance, different sets of instructions are recorded on audio CD 405 on different audio channels. The user selects at step 225 the set of instructions to listen to by switching via switch 120 to either the left or right audio channel. In the latter instance, the instructions are synchronized with respect to each other so that the user may switch from one set of instructions on one channel, e.g., the left channel, to another set of instructions on another channel, e.g., the right channel, and then back to the original channel, in sequence with the instructions on each channel for exercising the particular muscle group.

Upon completion of the particular exercise selected at step 230, the user continues on to the next exercise for which instructions are provided on the same or one or more subsequent tracks on the CD. The user continues in this manner for each exercise performed for each muscle group, until the end of the instructions on the CD, or the user opts to end the work out. At step 235, the user performs a cool down routine as guided by the instructions provided on the audio CD 405.

Figure 5:
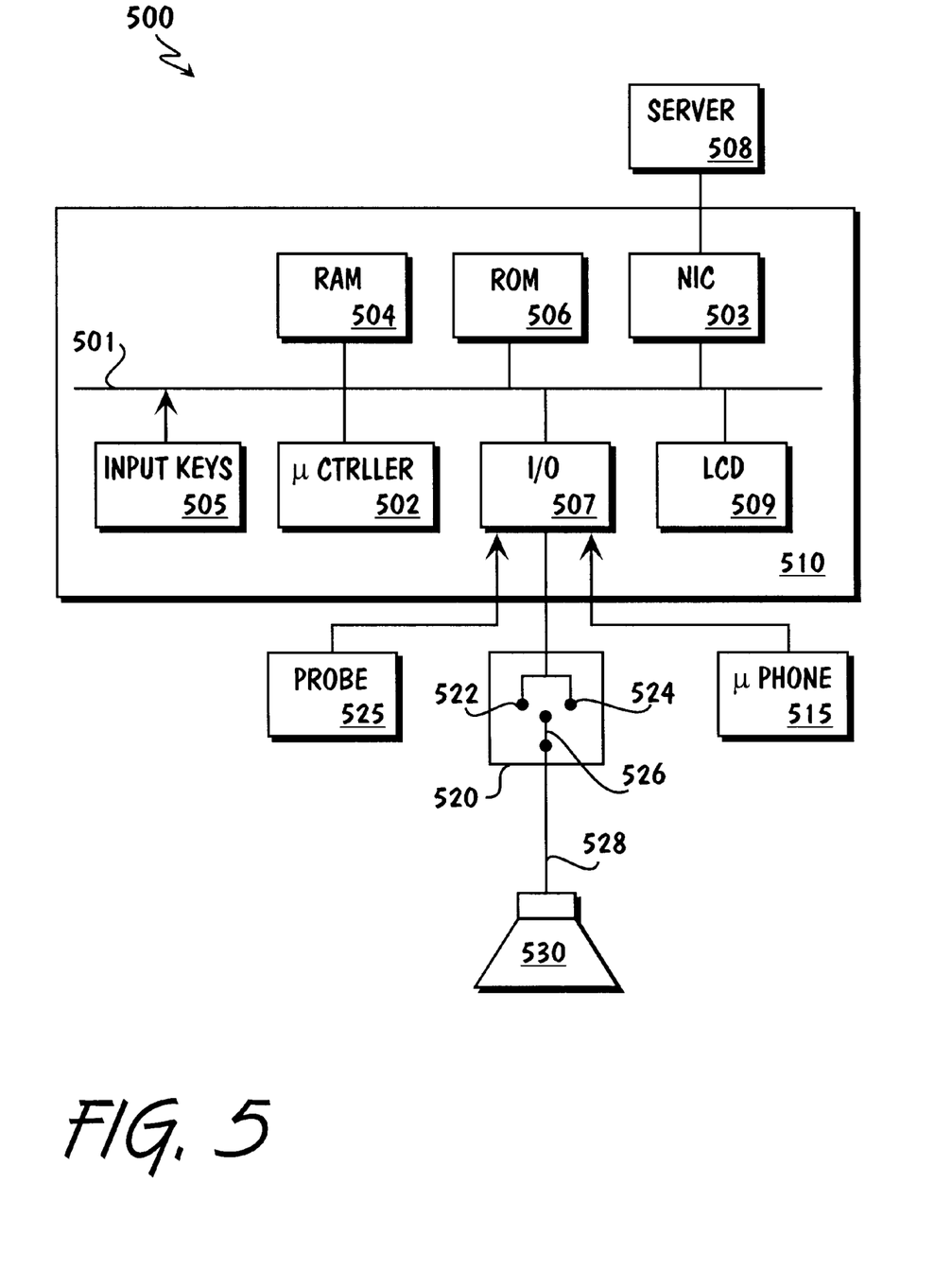
FIG. 5 is a block diagram of an alternative device as may be utilized by an embodiment of the present invention.

Yet another embodiment of the present invention is illustrated with reference to FIGS. 2 and 5. Referring to FIG. 5, a mobile audio playback system upon which an embodiment of the present invention can be implemented is shown as 500. The system includes a hand held electronic playback device 510 that comprises a bus or other communication means 501 for communicating information, and a microcontroller or other processing means 502 coupled with bus 501 for processing information. Device 500 further comprises a random access memory (RAM) or other dynamic storage device 504, coupled to bus 501 for storing information and instructions to be executed by processor 502. RAM 504 also may be used for storing temporary variables or other intermediate information during execution of instructions by processor 502. Device 510 also comprises a read only memory (ROM) and/or other static storage device 506 coupled to bus 501 for storing static information and instructions for processor 502.

In one embodiment of the invention, device 510 of mobile audio playback system 500 is configured with a network interface 503 or modem for coupling device 510 to a data communications network such as an intranet, the Internet or World Wide Web graphical portion of the Internet, to access and download from a server 508 real-time instructions for a physical fitness training program. Software is provided for obtaining information from intranet or Internet accessible databases. Alternatively, a simple interface, e.g., an RS-232 asynchronous port, may be provided to communicate with a computer, such as a Personal Computer (PC), which, in turn, is configured with a network interface 503 or modem for coupling device 510 to a data communications network such as an intranet, the Internet or World Wide Web graphical portion of the Internet, to access and download from a server 508 real-time instructions for a physical fitness training program.

Device 510 is coupled via bus 501 to a display device 509, such as a liquid crystal display screen. An input device 505, including input keys, is typically coupled to bus 501 for communicating selections to processor 502. Alternatively, other input devices such as a stylus or pen can be used to interact with the display. An object or icon representing, for example, a set of real-time instructions for physical fitness training, can be displayed on LCD screen 509 and selected by a user via a stylus or pen that touches the displayed object. The system detects the selection by implementing a touch sensitive screen. Similarly, a light pen and a light sensitive screen can be used for selecting a displayed object.

An audio speaker 530, e.g., a headset, is coupled by a wireless or wired communications medium to input/output interface 507 of mobile playback device 510 to receive audio output from device 510. Switch 520 may be used to select between a left or right channel of a stereo signal output by device 510. The system 500 allows device 510 to receive input from probe 510 and microphone 515. Probe 510 provides biometric data obtained from the user, including, for example, heart rate, blood pressure, oxygen uptake, breathing rate, etc. Such data may be stored and then uploaded to a computer system such as server 508 for subsequent statistical or other analysis and summary. Alternatively, such data may provide a feedback mechanism by which system 500 modifies or adapts the instructions provided to the user for performing a physical fitness routine. For example, the number of repetitions, the rate of repetitions, or the period of rest between sets of repetitions relating to a particular exercise may be increased or decreased to maintain the user in a target zone for optimum benefit. Microphone 515 allows the user to select options and otherwise control the operation of system 500 in providing real time instructions for physical fitness training to the user.

The mobile audio playback system 500 operates in accordance with the present invention in the following manner. Upon completion of viewing the introductory material at 205, the user connects device 510 to the server via wired or wireless means and selects via input keys 505 an appropriate audio program that is then downloaded to the device. The user may then disconnect the communications link between the server and the device. The audioprogram may be stored in RAM 504 for subsequent retrieval and playback beginning at step 210. Alternatively, ROM 506 may be programmed or "burned in" to include a set of real-time instructions for physical fitness routines. On powering up the device, the user can select via the input keys, the appropriate or desired sequence of instructions from the set of instructions stored in ROM 506, which instructions are loaded into RAM 504 for access and playback. The user is then ready to proceed with his/her exercise program, guided by the real-time instructions provided by the audioprogram. At step 210, the user initiates playback of the audioprogram stored in RAM 504. The audioprogram provides a preamble including, for example, a legal disclaimer, a brief summary of the subject matter of the audioprogram, the manner of proceeding in listening to the audioprogram and performing the exercises as instructed by the audioprogram. At step 215, the user is instructed to perform a warm-up routine in preparation of the exercise.

At step 220, the user is provided specific instructions for exercising a particular muscle group. The audio program instructs the user on the exercise to perform, the number of sets of repetitions to perform for the exercise, the number of repetitions per set, when to start a set of repetitions for the exercise, etc. As described above, the instructions at 220 provide options regarding the exercise to be performed for working a particular muscle group. At step 225, the user selects which exercise to perform, depending on, for example, user preference or the availability of necessary exercise equipment. At step 230, the user performs the number of sets of repetitions, number of repetitions per set, the proper duration for each repetition, etc., in accordance with real-time instructions. The instructions may be identical for each exercise option relating to a particular muscle group, and thus may be followed by the user regardless of the option selected by the user. Alternatively, the instructions may differ slightly depending on the exercise option selected. In the former instance, the user simply elects at step 225 to perform at step 230 whatever exercise option is provided at step 220. In the latter instance, different sets of instructions may be recorded on different audio channels. In such case, the user selects at 225 the set of instructions to listen to by switching via switch 520 to either the left or right channel. Alternatively, the user may select via the input keys different set of instructions on different audio channels.

Upon completion of the particular exercise selected at step 230, the user continues on to the next exercise for which instructions are provided by the audioprogram at step 220. The user continues in the same manner as described above for each exercise performed for each muscle group, until the end of the audioprogram, or the user opts to end the work out. At step 235, the user performs a cool down routine, which may including stretching or the like, in accordance with the instructions provided by the audioprogram.

While the embodiments of the present invention have been described and illustrated in detail, it is appreciated that modifications and adaptations to those embodiments, as well as other embodiments, may occur to those of ordinary skill in the art without departing from the scope of the present invention as set forth in the following claims.

What is claimed is:

1. A system providing personal physical fitness training, comprising:

an audio cassette tape having a first and a second audio channel and a first set of instructions for physical fitness training stored on the first audio channel and a second set of instructions for physical fitness training stored on the second audio channel;

an audio cassette player that reads the first and second set of instructions respectively stored on the first and second channels of the audio cassette tape; and an audio speaker communicatively coupled to the audio cassette player to provide audio tones comprising the first and second set of instructions read by the audio cassette player to a user wearing the audio speaker.

2. The system of claim 2, wherein the audio cassette tape having a first and a second audio channel and a first set of instructions for physical fitness training stored on the first audio channel and a second set of instructions for physical fitness training stored on the second audio channel comprises an audio cassette tape having a first and a second audio channel and a first set of real-time instructions for physical fitness training stored on the first audio channel and a second set of real time instructions for physical fitness training stored on the second audio channel.

3. The system of claim 1, wherein the first set of instructions stored on the first audio channel comprises a set of real-time instructions for physical fitness training using a first piece of exercise equipment and the second set of instructions stored on the second audio channel comprises a set of real-time instructions for physical fitness training using a second piece of exercise equipment.

4. The system of claim 2, wherein the second set of instructions stored on the second audio channel comprises a set of real-time instructions for physical fitness training using kinesthetic movements of the body.

5. The system of claim 4, wherein the set of real-time instructions stored on the first audio channel and the set of real-time instructions stored on the second audio channel are synchronized to provide physical fitness training involving a similar muscle group.

6. The system of claim 4, wherein the set of real-time instructions stored on the first audio channel and the set of real-time instructions stored on the second audio channel are synchronized to provide physical fitness training involving similar exercises.

7. The system of claim 1, wherein the audio cassette player concurrently reads the first and second set of instructions respectively stored on the first and second audio channels, the audio cassette player further comprising:

an audio channel selector that selects between the first and second audio channels such that the audio speaker communicatively coupled to the audio cassette player to provide audio tones comprising the set of instructions read by the audio cassette player to a user wearing the audio speaker provides audio tones from one of the first and second set of instructions read by the audio cassette player depending on whether the user has selected via the audio channel selector the first or second audio channel.

8. The system of claim 7, wherein the user, responsive to the set of instructions, selects via the audio channel selector the first or the second audio channel.

9. The system of claim 7, wherein the audio cassette tape having a first set of instructions for physical fitness training stored on the first audio channel and a second set of instructions for physical fitness training stored on the second audio channel comprises an audio cassette tape having a first set of real-time instructions for physical fitness training stored on the first audio channel and a second set of real-time instructions for physical fitness training stored on the second audio channel.

10. The system of claim 9, wherein the first set of instructions stored on the first audio channel comprises a set of real-time instructions for physical fitness training using exercise equipment.

11. The system of claim 9, wherein the first set of instructions stored on the first audio channel comprises a set of real-time instructions for physical fitness training using a first piece of exercise equipment and the second set of instructions stored on the second audio channel comprises a set of real-time instructions for physical fitness training using a second piece of exercise equipment.

12. The system of claim 10, wherein the second set of instructions stored on the second audio channel comprises a set of real-time instructions for physical fitness training using kinesthetic movements of the body.

13. The system of claim 12, wherein the set of real-time instructions stored on the first audio channel and the set of real-time instructions stored on the second audio channel are synchronized to provide physical fitness training involving a similar muscle group.

14. The system of claim 12, wherein the set of real-time instructions stored on the first audio channel and the set of real-time instructions stored on the second audio channel are synchronized to provide physical fitness training involving similar exercises.

15. The system of claim 13, wherein the user may switch via the audio output selector from the set of real-time instructions stored on the first audio channel to the set of real-time instructions stored on the second audio channel if the exercise equipment is unavailable.

16. A method for providing real-time instructions for personal physical fitness training, comprising the steps of:

a) selecting an audio cassette tape having stored thereon instructions for personal physical fitness training responsive to a person's physical fitness training objectives, the instructions comprising a plurality of sets of real time instructions, wherein each one of the sets of real time instructions comprises real time instructions for exercising a particular muscle group;

b) reading from the audio cassette tape via an audio cassette player the real time instructions for exercising a particular muscle group;

c) transmitting audio output via an audio speaker communicatively coupled to the audio cassette player to the person wearing the audio speaker, the audio output comprising the real time instructions for exercising a particular muscle group read from the audio cassette tape; and d) repeating steps b) through c) for different ones of the sets of real time instructions.

17. The method of claim 16, wherein each one of the sets of real time instructions for exercising a particular muscle group further comprises:

a) instruction specifying when to begin exercising the particular muscle group;

b) a number of repetitions to perform in exercising the particular muscle group; and c) a prescribed period of time for the person to rest upon completing the number of repetitions.

18. A method for providing real-time instructions for personal physical fitness training, comprising the steps of:

a) selecting a data storage medium having stored thereon a plurality of sets of real time instructions, each set providing instruction for exercising a particular muscle group responsive to a person's physical fitness training objectives;

b) reading from the data storage medium via an electronic device at least one of the sets of real time instructions;

c) transmitting audio output via an audio speaker communicatively coupled to the electronic device to the person wearing the audio speaker, the audio output comprising the at least one of the sets of real time instructions read from the data storage medium; and d) repeating steps b) through c) for different ones of the sets of real time instructions.

19. An article of manufacture, comprising an electronic device usable medium having stored thereon electronic device readable data for causing the electronic device to transmit audio and video output comprising real time instructions for performing physical fitness training.

20. The article of manufacture in claim 19, wherein the electronic device usable medium having stored thereon electronic device readable data comprises a plurality of sets of electronic device readable data, wherein one of the plurality of sets of electronic device readable data is selected by the user in response to the real time instructions for performing physical fitness training.

21. The article of manufacture in claim 20, wherein each of the plurality of sets of electronic device readable data stored on the electronic device usable medium is accessible via a separate audio channel.

22. The article of manufacture in claim 21, wherein two of the plurality of sets of electronic device readable data stored on the electronic device usable medium are synchronized in real time for simultaneous access via separate audio channels.

23. The article of manufacture in claim 22, wherein the separate audio channels are selectable by a user.

* * * * *